United States Patent Office 3,458,547
Patented July 29, 1969

3,458,547
PREPARATION OF IrH$_3$[P(R)$_3$]$_2$ COMPOUNDS
Robert Stevenson Coffey, Norton-on-Tees, England, assignor to Imperial Chemical Industries Limited, London, England, a corporation of Great Britain
No Drawing. Filed June 6, 1966, Ser. No. 555,215
Claims priority, application Great Britain, June 11, 1965, 24,771/65
Int. Cl. C07f 15/00; B01j 11/06
U.S. Cl. 260—429          9 Claims

ABSTRACT OF THE DISCLOSURE

There is provided a process for the production of iridium compounds of formula:

IrH$_3$(P[R$_1$R$_2$R$_3$])$_2$ in which R$_1$, R$_2$, R$_3$ are alkyl, cycloalkyl, aryl, alkaryl, aralkyl, alkenyl, cycloalkenyl, alkoxy, aryloxy or heterocyclic groups, in which a compound of formula:

IrY$_3$(P[R$_1$R$_2$R$_3$])$_n$ in which at least one Y is an anionic element or group and any remaining Y being hydrogen atoms, and $n$ is 2 or 3, dissolved or suspended in an inert solvent is contacted with a complex hydride of boron to form a complex compound and the complex compound decomposed to yield the desired iridium compound. Suitably the hydride of boron is an alkaline borohydride and the decomposition is accomplished by the addition of water or an alcohol at temperatures in the range of 50 to 100° C. The compounds prepared by the process are useful catalysts for reactions involving olefinic and acetylenic bonds e.g. hydrogenation, hydroformylation and isomerisation. In addition they may be used as catalysts in hydrogen transfer reactions.

---

This invention relates to a process for the preparation of iridium compounds, to their use as catalysts and to a novel group of iridium compounds.

Accordingly, the invention is a new process for the production of compounds of formula IrH$_3$(Z[R$_1$R$_2$R$_3$])$_n$ in which $n$ is 2 or 3, Z is phosphorous, arsenic or antimony, R$_1$, R$_2$, R$_3$ are alkyl, cycloalkyl, aryl, alkaryl, aralkyl, alkenyl, cycloalkenyl, alkoxy, aryloxy or heterocyclic groups, in which a compound of formula IrY$_3$(Z[R$_1$R$_2$R$_3$])$_n$ where at least one Y is an anionic element or group, any remaining Y being hydrogen atoms, and Z and R$_1$, R$_2$ and R$_3$ have the significance given above, dissolved or suspended in an inert solvent, is contacted with a complex hydride of aluminium or boron to form a complex compound and the complex compound decomposed to yield the desired iridium compound.

Y$_3$ may comprise the same or different anionic elements or groups and may be carboxylate e.g. acetate, cyanide or preferably a halogen particularly chlorine.

R$_1$, R$_2$ and R$_3$ which may be the same or different are preferably alkyl groups, particularly alkyl groups having from 1–12 carbon atoms such as methyl, ethyl, isopropyl, n-propyl, n-butyl and iso-butyl. Preferred aryl groups are phenyl groups while suitable aralkyl groups include benzyl and a suitable heterocyclic group is the pyridyl group.

The inert solvent may be any solvent which is inert to the reactants and products of the process and in which the complex hydride is soluble, and may suitably be an ether for example tetra-hydrofuran.

Complex hydrides of aluminium and boron which may be used in the process are of formula MBH$_4$ and MAlH$_4$ in which M is a cation, particularly a metal. Preferred metals are the alkali metals, especially lithium. It is usually preferable to use a complex borohydride, e.g. lithium borohydride, rather than a complex aluminium hydride, as use of the latter is often attended by increased by-product formation.

The complex compound which is formed by reaction between the compound of formula IrY$_3$(Z[R$_1$R$_2$R$_3$])$_n$ and the complex hydride of aluminium or boron may be decomposed in similar manner to the decomposition of known complexes formed between such complex hydrides and organic carbonyl compounds. For example the complex compounds may be decomposed by the addition of water or an alcohol, particularly a lower alcohol such as methanol.

The reactants in the process may be used in stoichiometric proportions, or the complex hydride of aluminium or boron may be present in excess. The substance used to decompose the complex compound is also preferably used in excess.

If free ligand Z(R$_1$R$_2$R$_3$) is present compounds are obtained in which $n=3$. If free ligand is not present a mixture of compounds in which $n=2$ or 3 or compounds in which $n=2$ are obtained. If desired compounds in which $n=2$ may be converted to those in which $n=3$ by treating them with a suitable ligand e.g. IrH$_3$(PPh$_3$)$_2$ may be be converted to IrH$_3$(PPh$_3$)$_3$ by heating with excess PPh$_3$.

The process may be performed at ambient or at an elevated temperature, for example in the range 50 to 100° C. Suitable temperatures may also be obtained by conducting the process at the boiling point of the solvent.

A feature of the present invention is a novel group of iridium compounds of the above formula IrH$_3$(Z[R$_1$R$_2$R$_3$])$_n$ in which at least one R$_1$R$_2$R$_3$ is alkyl, cycloalkyl, aralkyl, alkaryl, alkenyl, cycloalkenyl, alkoxy, aryloxy or a heterocyclic group.

We have found that the compounds of formula

IrH$_3$(Z[R$_1$R$_2$R$_3$])$_n$ are useful as catalysts, especially for reactions involving olefinic double bonds.

Particularly useful compounds are those in which Z is phosphorus and R$_1$R$_2$R$_3$ are the same or different alkyl groups, especially alkyl groups having from 1 to 12 carbon atoms, such as methyl, ethyl, isopropyl, n-propyl, n-butyl, iso-butyl or aralkyl groups such as benzyl.

Compounds in which one at least of R$_1$, R$_2$ or R$_3$ is alkyl, cycloalkyl, aralkyl, alkenyl or cycloalkenyl e.g. IrH$_3$(PEt$_3$)$_2$ and IrH$_3$(PEt$_2$Ph)$_2$ are preferred catalysts for use under ambient temperature conditions as they are characterised by considerably greater solubility at ambient temperatures in commonly used solvents such as alcohols, ethers, esters, paraffinic and aromatic solvents than compounds in which R$_1$, R$_2$ and R$_3$ are all aryl, alkaryl or heterocyclic groups. At elevated temperatures however complexes in which R$_1$, R$_2$ and R$_3$ are phenyl groups have increased solubility and in view of their higher catalytic activity are the preferred catalysts.

Thus an olefine or acetylene compound may be hydrogenated, an aldehyde hydrogenated to a primary alcohol or a ketone to a secondary alcohol, by contacting them with hydrogen in the presence of a compound of formula IrH$_3$(Z[R$_1$R$_2$R$_3$])$_n$.

The hydrogenation may be carried out at atmospheric pressure and at a temperature in the range 20–130° C. The ease of hydrogenation decreases in the order primary olefinic compounds > secondary olefinic compounds > acetylenic compounds > aldehydes and ketones and more severe conditions of temperature and pressure, for example about 100° C. and 100 atmospheres of hydrogen may be required to hydrogenate the more difficulty hydrogenable materials. Preferred iridium compounds for use as hydrogenation catalyst are $IrH_3(PEt_2Ph)_2$ $IrH_3(PPh_3)_2$ and $IrH_3(PPh_3)_3$ which may be used at concentrations in the range $10^{-5}$ to $10^{-3}$ molar.

Carbonyl compounds may also be produced by use of the catalytic properties of the compounds of the present invention.

Thus carbonyl compounds are produced by contacting an olefine or acetylene compound with carbon monoxide and hydrogen in the presence of a compound of formula $IrH_3(Z[R_1R_2R_3])_n$ at an elevated temperature and pressure. Such a process is known as hydroformylation.

$IrH_3(Ph_3P)_3$, $IrH_3(Ph_3P)_2$ and $IrH_3(PEt_2Ph)_2$ are suitable hydroformylation catalysts, although the latter compound is preferred. Olefines, particularly olefines containing 4 to 14 carbon atoms give rise to useful products such as aldehydes when reacted with carbon monoxide and hydrogen in accordance with the present invention.

The hydroformylation may be carried out at a temperature in the range 50–250° C. and a pressure in the range 250–2000 atmospheres and at a concentration of iridium compound of $10^{-4}$ to 1 molar.

The iridium compounds of the invention, of formula $IrH_3(Z[R_1R_2R_3])_n$ may also be used in a process for the isomerisation of compounds containing an olefinic bond, which comprises contacting such a compound with the iridium compound at an elevated temperature.

Compounds containing an olefinic double bond which may be isomerised include olefines particularly olefines of 4 to 12 carbon atoms.

Suitable iridium compounds are $IrH_3(Ph_3P)_3$ and $IrH_3(PEt_2Ph)_2$ which may be used at a concentration in the range $10^{-4}$ to 1 molar.

The temperature at which the isomerisation process is conducted may be in the range 20 to 100° C.

In addition to their catalytic effect in reactions involving olefinic and acetylenic compounds the iridium compounds of the present invention may also be used as catalysts in hydrogen transfer reactions.

For example, one hydrogen transfer process is a process in which an alcohol e.g. isopropanol is reacted with a ketone e.g. cyclohexanone to produce an alcohol e.g. cyclohexanol corresponding to the initial ketone, and ketone e.g. acetone having the same carbon number as the initial alcohol in the presence of an iridium compound of formula $IrH_3(Z[R_1R_2R_3])_n$.

The invention will be further illustrated by reference to the following examples.

EXAMPLE 1

Preparation of $IrH_3(PEt_2Ph)_2$

Lithium borohydride (0.4 g.) was added in portions over three hours to a stirred boiling solution of trans-trichloro tris (diethyl phenyl-phosphine) iridium III $(IrCl_3(PEt_2Ph)_3)$ (1.0 g.) in tetrahydrofuran (15 cc.). After 4 hours the mixture was cooled and hydrolysed with a mixture of methanol (5 cc.) and tetrahydrofuran (5 cc.). Evaporation of the solvent and extraction with light petroleum gave the product $IrH_3(PEt_2Ph)_2$ (0.33 g.) as prisms from methanol M.P. 78–80° C. (decomp.).

EXAMPLE 2

Preparation of $IrH_3(Ph_3P)_2$

Lithium borohydride (0.4 g.) was added in portions over three hours to a stirred suspension of hydrido dichloro tris (triphenyl phosphine) iridium (III) $(IrHCl_2(PPh_3)_3)$ (1.0 g.) in boiling tetrahydrofuran (15 cc.). The mixture was cooled after four hours and hydrolysed with methanol. The mixture was filtered and the residue extracted with tetrahydrofuran to leave the insoluble complex $IrH_3(Ph_3P)_2$.

EXAMPLE 3

$IrH_3(PPh_3)_3$ as a hydrogenation catalyst (a) Under 1 atmosphere pressure.—A $5.7 \times 10^{-3}$ molar solution of $IrH_3(PPh_3)_3$ in benzene (25 cc.) and octene-1 (20 cc.) was heated to reflux and stirred with a cruciform stirrer attached to a gas burette containing hydrogen gas. During ten hours, approximately 800 cc. of hydrogen gas were absorbed. The product was analysed by vapour phase chromatography to show the presence of n-octane.

(b) At 100 atmospheres pressure of hydrogen.—10 cc. of each of the compounds listed in the table below was shaken in an autoclave at 100 atmospheres of hydrogen and 100° C. for 15 hours with a solution of $IrH_3(PPh_3)_3$ (0.2 g.) in benzene (20 cc.).

The products obtained are shown in the table.

Table

| Starting material: | Product |
| --- | --- |
| Octene-1 | Octane. |
| Octene-2 | Octane. |
| Hexanone-2 | Hexanol-2. |
| Acetone | Iso-propanol. |
| Mesityl oxide | 4-methylpentanol-2. |
| Di-isobutylene | Octane. |
| Acrylonitrile | Propionitrile. |

EXAMPLE 4

$IrH_3(PEt_2Ph)_2$ as a hydrogenation catalyst

A solution of $IrH_3(PEt_2Ph)_2$ (1.0 g.) in octene-1 (1 g.) and benzene (5 cc.) was shaken at room temperature in an atmosphere of hydrogen. Over a period of five hours 80 cc. of hydrogen were absorbed. Octane was determined in the product of the hydrogenation by vapour phase chromatographic analysis.

EXAMPLE 5

$IrH_3(PPh_3)_2$ as a hydrogen transfer catalyst

A mixture of cyclohexanone (6 g.), isopropanol (33.5 g.) and 0.1 g. of $IrH_3(PPh_3)_2$ was refluxed at 82° C. for six and a half hours. During the reaction acetone was continuously removed and additional cyclohexanone (4.96 g.) and isopropanol (7.7 g.) added. Analysis of the reaction product revealed 7.5 g. of cyclohexanol together with unchanged cyclohexanone and isopropyl alcohol.

EXAMPLE 6

$IrH_3(PPh_3)_2$ as a hydroformylation catalyst

A mixture of $IrH_3(PPh_3)_2$ (0.36 g.) in dry benzene (20 cc.) was heated at 130° C. under a gas pressure of 1000 atmospheres (gas composition 92% ethylene, 4% carbon monoxide and 4% hydrogen by volume) for one hour. 1.7 g. of propionaldehyde was recovered from the product of the hydroformylation process.

EXAMPLE 7

$IrH_3(PPh_3)_3$ as an olefine isomerization catalyst

A solution of $IrH_3(PPh_3)_3$ ($10^{-2}$ molar) in benzene containing octene-1 (2 molar) was refluxed at 80° C.

under nitrogen. A vapour phase chromatographic examination of the product of the reaction revealed the presence of isomers of octene.

EXAMPLE 8

Preparation of $IrH_3(PEt_3)_2$ (1) By lithium aluminium hydride reduction.—Lithium aluminium hydride (0.35 g.) was added in portions over three hours to a stirred suspension of trans-trichloro tris (triethyl phosphine) iridium III $(IrCl_3(PEt_3)_3)$ in boiling tetrahydrofuran (15 cc.). The product was isolated with light petroleum (B.P. 40–60° C.) and recrystallised from methanol as white prisms, M.P. 33–34° C.

(2) By lithium borohydride reduction.—(1) above was repeated replacing the lithium aluminium hydride by 0.4 g. of lithium borohydride. The light petroleum (B.P. 60–80° C.) extract of the crude reaction product deposited triethyl phosphine borane as colourless needles (M.P. 45–48° C.). The required $IrH_3(PEt_3)_2$ was obtained by evaporating the petroleum mother liquors to dryness and recrystallising the residue from methanol.

EXAMPLE 9

Preparation of $IrH_3(PEt_2Ph)_2$ and $IrH_3(PEt_2Ph)_3$

Lithium aluminium hydride (0.35 g.) was added portionwise over 10 min. to a stirred solution of trichloro tris (diethyl phenyl phosphine) iridium III $$IrCl_3(PEt_2Ph)_3)$$

(1.0 g.) in tetrahydrofuran (15 cc.).

The mixture was heated under reflux for one hour, cooled and hydrolysed with wet tetrahydrofuran. Ether was added, the solvents removed under reduced pressure and the product isolated with light petroleum (B.P. 40–60° C.). The crude product, on digesting with methanol, yielded crystals which on recrystallisation from methanol gave $IrH_3(PEt_2Ph)_2$ (0.33 g.) as white prisms, M.P. 78–80° C. (decomp.). On concentrating the methanol washings $IrH_3(PEt_2Ph)_3$ was obtained as colourless needles (M.P. 107–109° C.).

EXAMPLE 10

Preparation of $IrH_3(AsEt_2Ph)_3$

A mixture of trichloro tris (diethyl diphenyl arsine) iridium III $(IrCl_3(AsEt_2Ph)_3)$ (1.0 g.), lithium aluminum hydride (0.4 g.) and tetrahydrofuran (10 cc.) was heated under reflux for 1¾ hours. After hydrolysis with wet tetrahydrofuran the mixture was evaporated to dryness and the light petroleum (B.P. 40–60° C.) soluble fraction recrystallised from ethanol to give $IrH_3(AsEt_2Ph)_3$ as white needles, M.P. 75° C. When lithium borohydride was used as reducing agent a similar yield was obtained.

EXAMPLE 11

Preparation of $IrH_3(PPh_3)_3$ (1) A mixture of hydrido dichloro tris (triphenyl phosphine) iridium III $(IrHCl_2(PPh_3)_3$ (1.0 g.) lithium aluminium hydride (0.4 g.) and tetrahydrofuran (15 cc.) was heated under reflux for 1 hour. Wet tetrahydrofuran was then added and the tetrahydrofuran-soluble portion recrystallised from tetrahydrofuran to give $IrH_3(PPh_3)_3$ as white needles, M.P. 225–227° C. (vac. decomp.).

(2) A mixture of triphenylphosphine, $(PPh_3)$ (0.27 g.), trihydro bis (triphenyl phosphine) iridium III $$(IrH_3(PPh_3)_2)$$

(0.75 g.) and tetrahydrofuran (15 cc.) was heated under reflux until most of the solid material had dissolved (40 mins.). The hot mixture was filtered and the filtrate concentrated under reduced pressure and cooled to give $IrH_3(PPh_3)_3$.

EXAMPLE 12

$IrH_3(PPh_3)_2$ as a hydrogenation catalyst

A $5.7 \times 10^{-3}$ molar solution of $IrH_3(PPh_3)_2$ in benzene (25 cc.) and octene-1 (20 cc.) was heated to reflux (85–90° C.) and stirred with a cruciform stirrer attached to a gas burette containing hydrogen gas. Over a period of 400 minutes 700 cc. of hydrogen gas were absorbed. The product was analysed by vapour phase chromatography to show the presence of n-octane. No. octene-1 was detected.

The above was repeated replacing the octene-1 by 20 cc. 1,5-cyclo-octadiene. After 265 minutes 606 cc. of hydrogen had been absorbed. Vapour phase chromatographic analysis showed the presence of cyclo-octene and 1,3 cyclo-octadiene, the presence of the latter product demonstrating the power of $IrH_3(PPh_3)_2$ to catalyse the isomerisation of the double bonds.

EXAMPLE 13

$IrH_3(PPh_3)_3$ as a hydrogenation catalyst

Following the procedure described in Example 3(b) $IrH_3(PPh_3)_3$ was found to catalyse the hydrogenation of phenyl acetylene to ethyl benzene and styrene.

Following the procedure of Example 3(a) however $IrH_3(PPh_3)_3$ was found to hydrogenate terminal double bonds (primary olefine) e.g. octene-1, but not non-terminal double bonds (secondary olefine) e.g. octene-2. This is in contrast to $IrH_3(PPh_3)_2$ which will hydrogenate non-terminal double bonds under the relatively milder conditions described in Example 3(a).

EXAMPLE 14

$IrH_3(PPh_3)_2$ as a hydrogen transfer catalyst 25 ml. of allyl alcohol and 0.1 g. of $IrH_3(PPh_3)_2$ were refluxed for 12 hours. On analysis by vapour phase chromatography the reaction mixture was found to contain 1½% by weight n-propanol and 3½% by weight acrolein. Propionaldehyde was formed as a by-product.

I claim:

1. A process for the production of iridium compounds of formula:

$$IrH_3(P[R_1R_2R_3])_2$$

in which $R_1R_2R_3$ are alkyl, cycloalkyl, aryl, alkaryl, aralkyl, alkenyl, cycloalkenyl, alkoxy, aryloxy or heterocyclic groups, in which a compound of formula:

$$IrY_3(P[R_1R_2R_3])_n$$

in which at least one Y is an anionic element or group and any remaining Y being hydrogen atoms, and $n$ is 3 dissolved or suspended in an inert solvent is contacted with a complex hydride of boron to form a complex compound and the complex compound decomposed to yield the desired iridium compound.

2. The process of claim 1 in which at least one Y is a carboxylate or cyanide group or a halogen atom.

3. The process of claim 2 in which the inert solvent is an ether.

4. The process of claim 2 in which the complex hydride of boron is an alkali metal boron hydride.

5. The process of claim 4 in which the complex compound formed between the compound of formula $IrY_3$-$(P[R_1R_2R_3])_n$ and the complex hydride of boron is decomposed by the addition of water or an alcohol.

6. The process of claim 5 in which the temperature is in the range 50 to 100° C.

7. The process of claim 1 in which $R_1$, $R_2$ and $R_3$ are phenyl groups.

8. The process of claim 1 in which at least one $R_1R_2R_3$ is an alkyl group having from 1 to 12 carbon atoms.

9. The process of claim 8 in which the alkyl group is selected from methyl, ethyl, isopropyl, n-propyl, n-butyl or isobutyl.

(References on following page)

References Cited

Malatesta et al.: Proceedings of the 8th International Conference on Coordination Chemistry, Vienna, Sept. 7–11, 1964, Springer-Verlag, Vienna, 1964, p. 210–3.

Hurd: Chemistry of the Hydrides, John Wiley and Sons, Inc., New York, N.Y., 1952, p. 163.

Nystrom et al.: J. Am. Chem. Soc., vol. 71 (1949), p. 3245–6.

Hayter: J. Am. Chem. Soc., 83 (1961), p. 1259.

Angoletta: Gazz. Chim. Ital., 92 (1962), p. 811–7.

Chatt et al.: J. Chem. Soc., 1963, p. 3371–3.

TOBIAS E. LEVOW, Primary Examiner

A. P. DEMERS, Assistant Examiner

U.S. Cl. X.R.

252—431; 260—290, 464, 596, 603, 604, 631, 638, 666, 667, 669, 683.65, 683.9, 690